(12) United States Patent
Wang et al.

(10) Patent No.: US 7,862,923 B2
(45) Date of Patent: Jan. 4, 2011

(54) POLYMERS FOR PROTON EXCHANGE MEMBRANES, PROTON EXCHANGE MEMBRANES, AND THEIR FABRICATION METHODS

(75) Inventors: Chuanfu Wang, Shenzhen (CN); Junqing Dong, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 1331 days.

(21) Appl. No.: 11/312,801

(22) Filed: Dec. 20, 2005

(65) Prior Publication Data

US 2006/0135702 A1 Jun. 22, 2006

(30) Foreign Application Priority Data

Dec. 21, 2004 (CN) .................... 2004 1 00970377

(51) Int. Cl.
*H01M 8/10* (2006.01)
(52) U.S. Cl. .............................. 429/33; 429/29; 429/30; 429/188; 526/274
(58) Field of Classification Search .................. 429/33, 429/29, 30, 188; 526/274
See application file for complete search history.

(56) References Cited

U.S. PATENT DOCUMENTS

| | | | | |
|---|---|---|---|---|
| 2,909,508 | A * | 10/1959 | Jones | ..................... 522/175 |
| 5,795,496 | A | 8/1998 | Yen et al. | |
| 6,444,343 | B1 * | 9/2002 | Prakash et al. | ................. 429/33 |
| 6,670,065 | B2 * | 12/2003 | Koyama et al. | ............... 429/33 |
| 6,828,407 | B2 * | 12/2004 | Sasaki et al. | .................. 528/86 |
| 2003/0096149 | A1 | 5/2003 | Koyama et al. | |

FOREIGN PATENT DOCUMENTS

| | | |
|---|---|---|
| CA | 2 394 674 A1 | 3/2003 |
| EP | 1 296 398 A2 | 8/2002 |

OTHER PUBLICATIONS

Truce & Heorger, The Chemistry of Sultones, I. Friedel-Crafts Reactions of Sultone, #76, p. 5357-5360, Nov. 5, 1954.

* cited by examiner

*Primary Examiner*—Peter D. Mulcahy
*Assistant Examiner*—Henry Hu
(74) *Attorney, Agent, or Firm*—Venture Pacific Law, PC

(57) ABSTRACT

The present invention relates to a proton exchange membrane having a polymer comprising of a main chain and a branch chain connected to said main chain wherein the chemical formula for said branch chain is

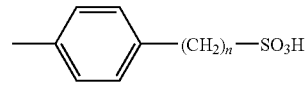

and where n is an integer. Said main chain is a polymer selected from the group that includes: aliphatic polymers, aliphatic block polymers, and aliphatic random copolymers. The fabrication method for said polymers comprises the steps of: reacting a polymer having a benzene ring in its branch chain with a sulfo-alkylated chemical reagent and a catalyst in an anhydrous solvent in an inert atmosphere; separating the resulting sulfo-alkylated polymer; and acidifying to obtain said fabricated polymer. Proton exchange membranes made with these polymers are pliant, do not expand much during wet conditions, and, are chemically, hydrolytically, dimensionally and thermally stable.

11 Claims, No Drawings

POLYMERS FOR PROTON EXCHANGE MEMBRANES, PROTON EXCHANGE MEMBRANES, AND THEIR FABRICATION METHODS

CROSS REFERENCE

This application claims priority from a Chinese patent application entitled "Polymers and Proton Exchange Membranes with these Polymers" filed on Dec. 21, 2004 having a Chinese Application No. 2004100970377. This application is incorporated herein by reference.

FIELD OF INVENTION

This invention relates to polymers with a new type of branch chain structure that can be used as polymers for proton exchange membranes, proton exchange membranes, and their fabrication methods. Particularly, it relates to polymers containing polymers containing a sulfonic radical and proton exchange membranes having these polymers.

BACKGROUND

Fuel cells are energy conversion devices that transform the stored chemical energy in fuels such as hydrogen and alcohols and oxidants such as oxygen to electric energy in accordance with electrochemical principles. They have a high energy conversion rate and are environmentally friendly. Since, proton exchange membrane fuel cells (PEMFC) can operate at low temperatures and have high specific power, they are a new power source for both civilian and military applications. For example, they can be used in independent power stations as well as a mobile power source for electric cars and submarines.

Proton exchange membranes are key components in PEMFC. Operating conditions for PEMFC require that the performance and stability of a proton exchange membrane to possess the following properties: first, a high proton conducting capability. As a proton conductor, a proton membrane has to have good proton conducting capabilities, at 0.1 S/cm or higher. In addition, it also has to insulate the electrons. Second, the proton exchange membrane should posses good mechanical properties. The proton membrane has to be strong enough to withstand the fluctuations in gas pressure during the operation of the fuel cell and not break or rupture. Thirdly, the proton exchange membrane should be chemically, hydrolytically, dimensionally and thermally stable.

In the past, the commonly used proton exchange membrane was a Nafion series membrane produced by E.I. DuPont de Nemours and Company in the United States. The Nafion series membrane is a membrane with a perfluorosulfonic structure. It is extremely stable chemically as it has an extremely stable C—F chemical bond. However, these membranes are expensive as they require a special fabrication process. Therefore, it is uneconomical to use these membranes in the commercial production of fuel cells. Furthermore, a large quantity of fluoride is used in the fabrication of the Nafion membranes. As a result, the reaction equipment for the production requires stringent and expensive specifications. In addition, the fabrication process produces harmful environmental pollutants. Therefore, there is a need to find materials for proton exchange membranes that are low in cost and do not contain or only partially contain fluorides.

U.S. Pat. No. 5,795,496 disclosed a method for treating a polymer to improve its proton conducting properties. The method includes the steps of: obtaining a treated polymer material capable of forming a material with requisite proton conducting properties; treating said polymer material using the sulfonation method to increases its proton conduction performance; and cross linking said sulfonic radical to obtain a material with an asymmetric balanced surface density. This method can produce a sulfonated polyether-ether-ketone (S-PEEK) proton exchange membrane. Further heat treating this membrane will produce a proton exchange membrane with a cross-linking structure. Membranes fabricated using this method have higher proton conducting properties and are thermally stable. However, they expand significantly after absorbing water, and have poor dimensional and hydrolytic stability. The structure of a sulfonic radical (—SO3H) that is directly connected to a benzene ring is unstable. When the sulfonic concentration is reduced and the temperature is increased, the sulfonic radical can be easily separated from the benzene ring, resulting in poor hydrolytic properties and limiting the life of the membrane.

EP1296398A2, CA2394674, U.S. Pat. No. 6,670,065B2 and US20030129467 disclosed polymers having an alkyl-sulfonic branch chain and aromatic main chain and their proton exchange membranes that have good hydrolytic resistance stability. U.S. Pat. No. 6,670,065B2 disclosed a solid polymer for electrolytes having a polyether sulfone. This polyether sulfone has a bonded sulfo-alkyl radical with the chemical formula: —$(CH_2)_n$-SO3H where n is an integer from 1 to 6. This electrolyte has good hydrolytic resistance stability. However, under dry conditions, the proton membrane made with this polymer is fragile and can easily rupture. Moreover, after absorbing water, the wet proton membrane expands substantially, resulting in a wet membrane with poor dimensional stability and poor mechanical strength.

Due to the limitations of the prior art, it is therefore desirable to have novel polymers for proton exchange membranes that are chemically, hydrolytically, dimensionally and thermally stable.

SUMMARY OF INVENTION

An object of this invention is to provide new polymers that can be used as proton exchange membranes.

Another object of this invention is to provide proton exchange membranes that are pliant and are chemically, hydrolytically, dimensionally and thermally stable.

Another object of this invention is to provide polymers for proton exchange membranes that are low in cost.

A presently preferred embodiment of the present invention relates to a proton exchange membrane having a polymer comprising of a main chain, and a branch chain connected to said main chain wherein the chemical formula for said branch chain is

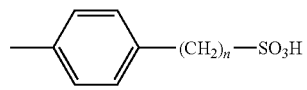

and where n is an integer. Said main chain is a polymer selected from the group that includes: aliphatic polymers, aliphatic block polymers, and aliphatic random copolymers. The fabrication method for said polymers comprises the steps: reacting a polymer having a benzene ring in its branch chain with a sulfo-alkylated chemical reagent and a catalyst in an anhydrous solvent in an inert atmosphere; separating the resulting sulfo-alkylated polymer; and acidifying to obtain said fabricated polymer.

An advantage of this invention is that proton exchange membrane made with the polymers of this invention are pliant, do not expand much during wet conditions, and are chemically, hydrolytically, dimensionally and thermally stable.

Another advantage of this invention is that polymers of this invention are low in cost.

DETAILED DESCRIPTION OF THE PREFERRED EMBODIMENTS

Presently preferred embodiments of the present invention include polymers ("proton exchange membrane polymers") comprising of a main chain and a branch chain connected to said main chain. The chemical formula for said branch chain is

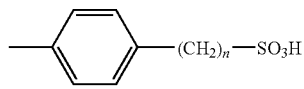

where n is an integer, wherein in the preferred embodiment n is from 3 to 6. The main chain and the branch chain are connected at one of the chemical bonds of the benzene ring in said branch chain. In another preferred embodiment, the preferred selection for n is either 3 or 4. Said main chain is a polymer (first polymer) selected from the following group: aliphatic polymers, aliphatic block polymers or aliphatic random copolymers.

The radical —$(CH_2)_n$—$SO_3H$ in said branch chain can be connected to the benzene ring in the branch chain at the para-position, meta-position, or ortho-position of the chemical bond of the benzene ring that connects to the main chain.

The average molecular weight of said proton exchange membrane polymer is from 100000 to 600000. The optimal values for the average molecular weight are from 200000 to 400000.

The equivalent weight (EW) of a polymer containing the [$SO_3H$] radical is the weight of the dry polymer with 1 mol of the [$SO_3H$] radical. The equivalent weight is the reciprocal of the ion exchange equivalent weight. The ion exchange capacity (IEC) of the polymer is the molar number of the [$SO_3H$] radical per gram of the dry proton exchange membrane polymer. The lower the value of the equivalent weight of a polymer, the higher its IEC is and the higher the molar number of the [$SO_3H$] radical per gram of said dry polymer.

The equivalent weight of said proton exchange membrane polymer is from 400 to 3000. The optimal values for the equivalent weight are from 600 to 1500. The equivalent weight of the polymer can be determined by using a base titration method. The steps for the determination include: vacuum drying the polymer at 110° C. for 24 hours; weighing the dried polymer where the weight, M, is measured in grams, immersing in a predetermined quantity of 1 mol/L sodium chloride solution for 24 hours to thoroughly undergo ion exchange; using phenolphthalein as an indicator and titrating with a 0.025 mol/L concentrated sodium hydroxide solution; recording the rate of consumption of the sodium hydroxide solution, V, in ml.; and computing the equivalent weight of said polymer with the following formula:

$$EW = \frac{M \times 1000}{V \times 0.025}.$$

The following polymers (proton exchange membrane polymers) are embodiments of this invention using the non-exhaustion method. These polymers can be used as proton exchange membranes.

Embodiment A

The molecular (chemical) formula for the polymer of this embodiment, a sulfo-alkylated polystyrene, is:

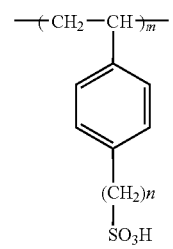

where m is an integer from 1000 to 6000. The optimal values for m are integers from 2000 to 4000.

Embodiment B

This embodiment is a polymer having the following molecular formula:

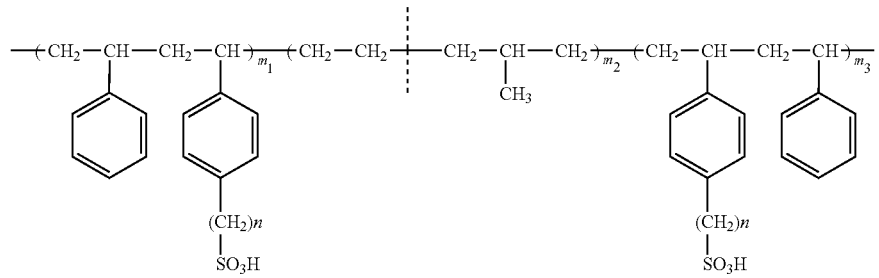

where $m_1$ and $m_3$ are integers from 0 to 3000 and $m_1+m_3>0$. The optimal values of $m_1$ and $m_3$ are integers from 500 to 1500, and $m_2$ is an integer from 0 to 5000 with the optimal values of $m_2$ from 1500 to 3500. When $m_1 \neq 0$, $m_2 \neq 0$, and $m_3 \neq 0$, the polymer in this embodiment is a sulfo-alkylated polystyrene-polyethylene/butylene-polystyrene block polymer (SEBS).

Embodiment C

This embodiment is a polymer having the following molecular formula:

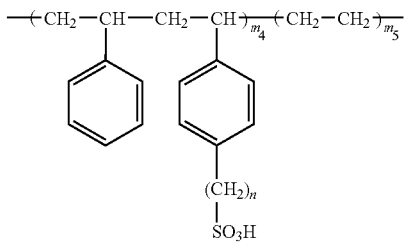

where $m_4$ is an integer from 300 to 3000 and $m_5$ is an integer from 1000 to 10000. The optimal values for $m_4$ are integers from 500 to 1500 and $m_5$ are integers from 2000 to 6000. When $m_5$ is not zero, the polymer is a sulfo-alkylated polystyrene-polyethylene block polymer (SE).

Embodiment D

This embodiment is a sulfo-alkylated polystyrene-ethylene copolymer having the following molecular formula:

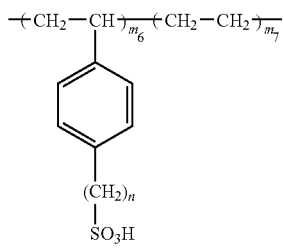

where $m_6$ is an integer from 300 to 3000 and $m_7$ is an integer from 1000 to 10000. The optimal values for $m_6$ are integers from 500 to 1500 and $m_7$ are integers from 2000 to 6000.

Embodiment E

This embodiment is a sulfo-alkylated polystyrene-butylene copolymer having the following molecular formula:

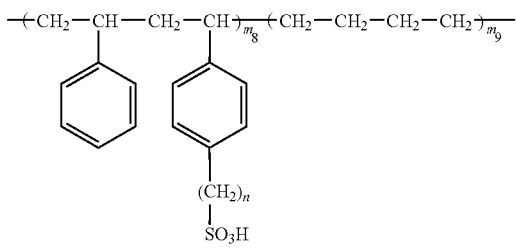

where $m_8$ is an integer from 300 to 3000 and $m_9$ is an integer from 1000 to 6000. The optimal values for $m_8$ are integers from 500 to 1500 and $m_9$ are integers from 2000 to 3000. When $m_9$ is not zero, the polymer is a sulfo-alkylated polystyrene-butylene copolymer.

Embodiment F

The polymer of this embodiment is a sulfo-alkylated poly (α-methyl-styrene) having the following molecular formula:

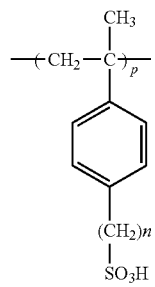

where p is an integer from 1000 to 5000 with the optimal values of p is are integers from 2000 to 3000.

Embodiment G

The polymer of this embodiment is a sulfo-alkylated poly-trifluoro-styrene having the following molecular formula:

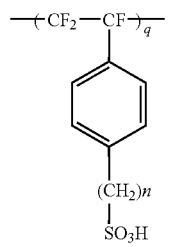

where q is an integer from 1000 to 5000 with the optimal values of q being integers from 1500 to 3000.

These embodiments can be fabricated by sulfo-alkylating and modifying existing polymers. In the alternative, they can also be fabricated by first fabricating the functional unit of the branch chain and then polymerizing.

A preferred fabrication method for the polymers that are embodiments of this invention includes the following steps: contacting and reacting a polymer with a benzene ring in its branch chain (second polymer) with a sulfo-alkylated chemical reagent in an anhydrous solvent with a catalyst in an inert atmosphere, separating the resulting sulfo-alkylated polymer; and acidifying to obtain said fabricated polymer. The reaction temperature for said contacting and reacting step is from 0° C. to 150° C. The preferred reaction temperature is from 20° C. to 120° C. The reaction time for said contacting and reacting step is from 1 hour to 200 hours. The preferred reaction time is from 5 hours to 50 hours.

The catalyst used can be selected from one or more of the following: anhydrous aluminum trichloride, anhydrous zinc chloride, anhydrous ferric chloride, phosphate solid, hydrogen fluoride, aluminum silicate and BF3-H3PO4. The preferred selection for the catalyst is one or more of the following: anhydrous aluminum trichloride, anhydrous zinc chloride and hydrogen fluoride.

The sulfo-alkylated chemical reagent can be one or more of the following: 1,3-propane sultone, 1,4-butane sultone, 1,5-pentane sultone and 1,6-hexane sullactone. Preferably, it is 1,3-propane sultone or 1,4-butane sultone. The molar ratio of said sulfo-alkylated chemical reagent, catalyst, polymer with a benzene ring and solvent is 1:0.1-3:0.01-2:2-30. The preferred ratio is 1:0.5-2:0.3-1.5:3-15.

Said anhydrous solvent is a solvent that can dissolve said polymer with a branch chain having a benzene ring, catalyst and sulfo-alkylated reagent, and can be removed after being used. It can be one or more of the following anhydrous solvents: anhydrous nitrobenzene, anhydrous ortho-nitrobenzene, anhydrous chloroform, anhydrous dichloroethane, anhydrous cyclohexane, anhydrous dimethyl sulfoxide, anhydrous N, N-dimethylformamide, anhydrous N-methyl pyrrolidinone, anhydrous acetone, anhydrous butanone, anhydrous cyclohexanone. Preferably, it is one or more of the following: anhydrous nitrobenzene, anhydrous chloroform, anhydrous dichloroethane, anhydrous cyclohexane and anhydrous dimethyl sulfoxide.

Said inert atmosphere is any gas that does not react any of the reactants or products in the fabrication process and can be nitrogen or one or more of the gases in the zero group of the periodic table of elements or a mixture the gases listed above. The preferred inert atmosphere is either nitrogen and/or argon.

Said polymers with a benzene ring in its branch chain can be selected from structural units of aliphatic polymers connected to a polymer with a benzene ring. An example is polystyrene with a molecular formula of:

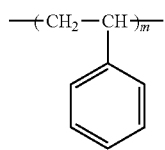

where m is an integer from 1000 to 6000. The optimal values of m are integers from 2000 to 4000. Said polymer with benzene rings in its branch chain can be polymers with the following molecular formula:

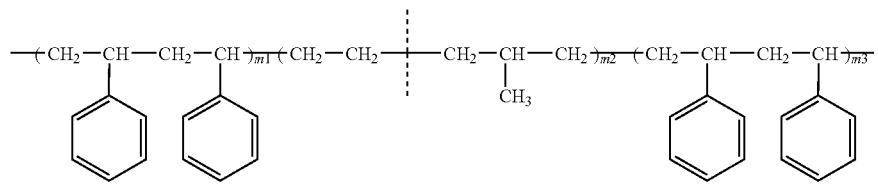

where $m_1$ and $m_3$ are integers from 0 to 3000 and $m_1+m_3>0$. The optimal values of $m_1$ and $m_3$ are integers from 500 to 1500. $m_2$ is an integer from 0 to 5000 with the optimal values of $m_2$ from 1500 to 3500. When $m_1 \neq 0$, $m_2 \neq 0$, and $m_3 \neq 0$, the polymer in this embodiment is a polystyrene-polyethylene/butylene-polystyrene block polymer (SEBS).

The polymer with benzene rings in its branch chain can also be polymers with the following molecular formula:

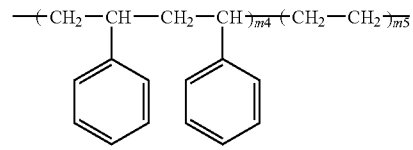

where $m_4$ is an integer from 300 to 3000 and $m_5$ is an integer from 1000 to 10000. The optimal values for $m_4$ are integers from 500 to 1500 and $m_5$ are integers from 2000 to 6000. When $m_5$ is not zero, the polymer is polystyrene-polyethylene block polymer (SE).

Said polymer with a benzene ring in its branch chain can also be a polystyrene-ethylene copolymer with the following molecular formula:

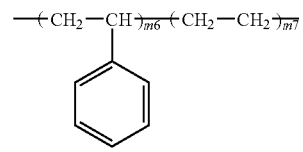

where $m_6$ is an integer from 300 to 3000 and $m_7$ is an integer from 1000 to 10000. The optimal values for $m_6$ are integers from 500 to 1500 and $m_7$ are integers from 2000 to 6000. When $m_7$ is not zero, the polymer is polystyrene-ethylene copolymer.

Said polymer with a benzene ring in its branch chain can also be a polystyrene-butylene copolymer with the following molecular formula:

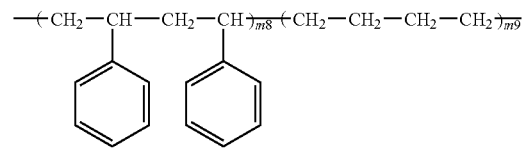

where $m_8$ is an integer from 300 to 3000 and $m_9$ is an integer from 1000 to 6000. The optimal values for $m_8$ are integers from 500 to 1500 and $m_9$ are integers from 2000 to 3000. When $m_9$ is not zero, the polymer is a polystyrene-butylene copolymer.

Said polymer with a benzene ring in its branch chain can also be a poly(α-methyl-styrene) with the following molecular formula:

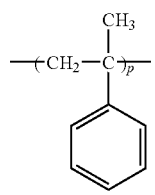

where p is an integer from 1000 to 5000 with the optimal values of p being integers from 2000 to 3000.

Said polymer with a benzene ring in its branch chain can also be a poly-trifluoro-styrene with following molecular formula:

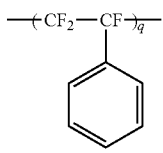

where q is an integer from 1000 to 5000 with the optimal values of q being integers from 1500 to 3000.

The polymer with a benzene ring in its branch chain can be purchased from commercialized polymers. It can also be fabricated from units using existing fabrication methods.

The acidification of said polymer can be accomplished with conventional methods such as mixing the obtained polymer with a type of acid solution; ion exchanging, and neutralizing by rinsing with de-ionized water. The quantity of acid used is usually 10 to 10000 times the molar quantity of the sulfonic radical of the polymer. Preferably, the quantity is from 100 to 5000 times.

The sulfonic radical is added by a sulfo-alkylated reaction of the polymer to produce the structure of the polymers that are embodiments of the invention. This sulfonic radical (—SO3H) has a characteristic molecular vibration spectrum. The peaks at 1211 cm-1 and 1032 cm-1 are the symmetric and asymmetric vibration absorption peaks of (O=S=O). The peak at 710 cm-1 is the (S—O) vibration absorption peak. Therefore, infrared spectrum method can be used to confirm the structure of the polymers that are embodiments of this invention.

An example of the chemical reaction in the fabrication of said polymer is illustrated in the following equation that describe the chemical reaction in fabricating the sulfo-alkylated polystyrene polymer in Embodiment A:

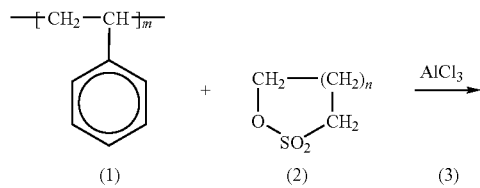

-continued

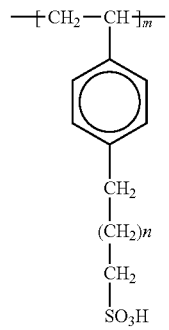

(4)

In this reaction equation, (1) is the second polymer, the polymer with a benzene ring in its branch chain, (2) is the sulfo-alkylated reagent; (3) is the catalyst; and (4) is the fabricated proton exchange membrane polymer that is Embodiment A.

Proton exchange membranes with polymers that are embodiments of this invention can be fabricated in the conventional manner, except that the conventional polymers in conventional proton exchange membranes are now substituted by polymers that are embodiments of this invention. For example, the solution casting method can be used to fabricate the proton exchange membranes with polymers that are embodiments of this invention. This method includes the steps of: dissolving the polymer that is an embodiment of this invention in a solution such that the resulting concentration of the polymer is from 0.1 wt % to 20 wt %. Preferably, the concentration is from 3 wt % to 10 wt %; and evaporating said solvent in a horizontal container.

There are no particular limitations on the solvent used to dissolve said polymers except that this solvent has to able to be removed after use. The solvent can be selected from one or more of the following: methanol, ethanol, isopropanol, butanol, toluene, nitrobenzene, ortho-nitrobenzene, chloroform, dichloroethane, cyclohexane, dimethyl sulfoxide, N, N-dimethylformamide, N-methyl pyrrolidinone, acetone, butanone and cyclohexanone.

The temperature for evaporating the solvent can be from normal temperature to 170° C. The preferred evaporation temperature is from 30° C. to 120° C. Before evaporation, the concentration of the polymer is from 0.1 to 20 wt %; the optimal concentration is from 3 wt % to 10 wt % to obtain the proton exchange membrane that is from 10 micrometers to 500 micrometers thick.

The thickness of the proton exchange membranes with polymers that are embodiments can be the same thickness as conventional proton exchange membranes. Generally speaking, they can be from 10 micrometers to 500 micrometers. Preferably, the thickness should from 20 micrometers to 100 micrometers.

The following embodiments further explain and describe the polymers and proton exchange membranes of this invention.

Embodiment 1

(1) The fabrication of sulfo-alkylated polystyrene includes the following steps:
adding 13 g of polystyrene resin (PS, Polystyro® 143 E, products of BASF (China) Co. Ltd.) into a nitrogen protected four opening flask;

adding 50 ml of anhydrous nitrobenzene and 12.2 g 1,3-propane-sulfonic-lactone;

slowly adding 14.7 g anhydrous aluminum trichloride after the polystyrene resin has thoroughly dissolved;

maintaining the reaction temperature at 80° C. and reacting for 30 hours at the condensation reflux state;

pouring the reaction solution into a 500 ml ice water mixture containing 50 ml concentrated hydrochloric acid to terminate the reaction;

filtering the grain shaped polymers;

adding the polymer into a 200 ml 0.5 mol/L sodium hydroxide solution;

soaking overnight;

neutralizing the remaining hydrochloric acid in the resin;

rinsing the polymer grains with a large quantity of de-ionized water until the water is neutral;

filtering to obtain the hydrolytic product, aluminum trichloride;

restoring the acidity of the resin by using 0.5 mol/L of dilute sulfuric acid. The quantity of the dilute sulfuric acid used, 0.5 mol/L, is 200 times the molar quantity of the sulfonic radical of the polymer;

rinsing until neutral with de-ionized water;

vacuum drying at 110° C. to obtain the polymer in this embodiment.

The EW value of this polymer is 986. Its average molecular weight is 300000. Its infrared spectrum shows that there are symmetric and asymmetric vibration absorption peaks of (O=S=O) at 1211 cm-1 and 1032 cm-1, and a vibration absorption peak of (S—O) at 710 cm-1.

The average molecular weight is determined by using the infiltration pressure method. The infrared spectrum is obtained using the potassium bromide coating method from the NEXUS470 Fourier Transformed Infrared Spectroscopy from Nicolet in the United States.

(2) The fabrication of the proton exchange membrane includes the following steps:

dissolving 5 g of the polymer in this embodiment obtained from step (1) in 95 g of toluene/methanol solvent mixture where the weight ratio of toluene/methanol is 1:1 to obtain a 5 wt % content polymer solution;

adding 20 ml of solution into a glass container with an area of 50 cm2; and volatizing the solvent by horizontally heating at 50° C. on a flat platform to obtain the 100 micrometer thick proton exchange membrane.

Embodiment 2

(1) The fabrication of sulfo-alkylated polystyrene-polyethylene/butylene-polystyrene block polymer includes the following steps:

adding 8 g of polystyrene-polyethylene/butylene-polystyrene block polymer (SEBS, G1650, and KRATON Polymers that are, products of the KRATON Polymers Company.) into a nitrogen protected four opening flask;

adding 50 ml of anhydrous 1,2-dichloroethane and 12.2 g of 1,3-propane sultone;

slowly adding 14.7 g anhydrous aluminum trichloride after the SEBS is thoroughly dissolved; maintaining the reaction temperature at 80° C., reacting for 20 hours at the condensation reflux state;

pouring the reaction solution into a 500 ml ice water mixture containing 50 ml concentrated hydrochloric acid to terminate the reaction;

filtering the grain shaped polymers;

adding the polymer into a 200 ml 0.5 mol/L sodium hydroxide solution;

soaking overnight;

neutralizing the remaining hydrochloric acid in the resin;

rinsing the polymer grains with a large quantity of de-ionized water until the water is neutral;

filtering to obtain the hydrolytic product, aluminum trichloride;

restoring the acidity of the resin by using 0.5 mol/L of dilute sulfuric acid. The quantity of dilute sulfuric acid used, 0.5 mol/L, is 1000 times the molar quantity of the sulfonic radical of the polymer;

rinsing until neutral with de-ionized water; and vacuum drying at 110° C. to obtain the polymer in this embodiment.

The EW value of this polymer is 1027. The average molecular weight is 290000. The infrared spectrum of this polymer shows that there are symmetric and asymmetric vibration absorption peaks of (O=S=O) at 1211 cm-1 and 1032 cm-1, and a vibration absorption peak of (S—O) at 710 cm-1.

(2) Fabrication of the proton exchange membrane includes the following steps:

dissolving 5 g of the resin obtained in this embodiment from step (1) in 95 g of 1,2-dichloroethane/isopropanol mixture where the weight ratio of 1,2-dichloroethane/isopropanol is 1:1 to fabricate a 5 wt % solution;

adding 20 ml of solution into a glass container with an area of 50 cm2;

volatizing the solvent on a flat platform by horizontally heating at 60° C. to obtain the 100 micrometer thick proton exchange membrane of this embodiment.

Embodiment 3

(1) The fabrication of the sulfo-alkylated polystyrene-polyethylene block polymer includes the following steps:

adding 8.5 g of polystyrene-polyethylene block polymer (SE from, Dow Chemical Company.) into a nitrogen protected four opening flask;

adding 50 ml of anhydrous 1,2-dichloroethane and 12.2 g of 1,3-propane sultone;

slowly adding 14.7 g anhydrous aluminum trichloride after the polystyrene-ethylene block polymer resin is thoroughly dissolved;

maintaining the reaction temperature at 80° C. and reacting for 30 hours at the condensation reflux state;

pouring the reaction solution into a 500 ml ice water mixture containing 50 ml concentrated hydrochloric acid to terminate the reaction;

filtering the grain shaped polymers;

adding the polymer into a 200 ml 0.5 mol/L sodium hydroxide solution;

soaking overnight;

neutralizing the remaining hydrochloric acid in the resin;

repeatedly rinsing the polymer grains with a large quantity of de-ionized water until the water is neutral;

filtering to obtain the hydrolytic product, aluminum trichloride;

restoring the acidity of the resin by using 0.5 mol/L of dilute sulfuric acid. The quantity of the dilute sulfuric acid used, 0.5 mol/L, is 4000 times the molar quantity of the sulfonic radical of the polymer;

rinsing until neutral with de-ionized water; and vacuum drying at 110° C. to obtain the polymer in this embodiment.

The EW value of this polymer is 1011. The average molecular weight is 280000. The infrared spectrum of this polymer shows that there are symmetric and asymmetric vibration absorption peaks of (O=S=O) at 1211 cm-1 and 1032 cm-1, and a vibration absorption peak of (S—O) at 710 cm-1.

(2) Fabrication of the proton exchange membrane includes the following steps:

dissolving 5 g of the resin obtained from step (1) in 95 g of toluene/dimethyl sulfoxide solvent mixture to fabricate a 5 wt % solution;

adding 20 ml of solution into a glass container with an area of 50 cm2; and volatizing the solvent on a flat platform by horizontally heating at 50° C. to obtain the 100 micrometer thick proton exchange membrane of this embodiment.

Embodiment 4

(1) The fabrication of sulfo-alkylated styrene-ethylene random copolymer in this embodiment uses a method referred to in "Acta Polymerica Sinica," 1, 2000, P74, to synthesize the styrene-ethylene random copolymer and the purifying to obtain the dry resin polystyrene-ethylene random copolymer of this embodiment. It includes the following steps:

adding 12 g of purified dry resin styrene-ethylene random copolymer into a nitrogen protected four opening flask;

adding 50 ml of anhydrous chloroform and 12.2 g 1,3-propane sultone;

slowly adding 14.7 g anhydrous aluminum trichloride after the styrene-ethylene copolymer resin is thoroughly dissolved;

maintaining the reaction temperature at 40° C., reacting for 40 hours at the condensation reflux state;

pouring the reaction solution into a 500 ml ice water mixture containing 50 ml concentrated hydrochloric acid to terminate the reaction;

filtering the grain shaped polymers;

adding the polymer into a 200 ml 0.5 mol/L sodium hydroxide solution;

soaking overnight;

neutralizing the remaining hydrochloric acid in the resin;

repeatedly rinsing the polymer grains with a large quantity of de-ionized water until the water is neutral;

filtering to obtain the hydrolytic product aluminum trichloride;

restoring the acidity of the resin by using 0.5 mol/L of dilute sulfuric acid. The quantity of dilute sulfuric acid used, 0.5 mol/L, is 1000 times the molar quantity of the sulfonic radical of the polymer);

using de-ionized water to rinse until neutral; and vacuum drying at 110° C. to obtain the polymer in this embodiment.

The EW value of this polymer is 995. The average molecular weight is 330000. The infrared spectrum of this polymer shows that there are symmetric and asymmetric vibration absorption peaks of (O=S=O) at 1211 cm-1 and 1032 cm-1, and a vibration absorption peak of (S—O) at 710 cm-1.

(2) Fabrication of the proton exchange membrane includes the following steps:

dissolving 5 g of the resin in this embodiment obtained from step (1) in 95 g of N, N-dimethylformamide to obtain a 5 wt % solution;

adding 20 ml solution into a glass container with an area of 50 cm2; and volatizing the solvent on a flat platform by horizontally heating at 80° C. to obtain the 100 micrometer thick proton exchange membrane of this embodiment.

Embodiment 5

The fabrication of sulfo-alkylated polystyrene-butylene random copolymer in this embodiment uses a method referred to in "Acta Polymerica Sinica," 1, 2000, P74, to synthesize the styrene-butylene random copolymer and purifying to obtain the dry resin styrene-butylene random copolymer. It includes the steps of:

adding 11.5 g of purified dry resin polystyrene-butylene random copolymer into a nitrogen protected four opening flask;

adding 100 ml of anhydrous chloroform and 12.2 g 1,3-propane sultone;

slowly adding 14.7 g anhydrous aluminum trichloride after the styrene-ethylene copolymer resin is thoroughly dissolved;

maintaining the reaction temperature at 40° C., reacting for 20 hours at the condensation reflux state;

pouring the reaction solution into a 500 ml ice water mixture containing 50 ml concentrated hydrochloric acid to terminate the reaction;

filtering the grain shaped polymers;

adding the polymer into a 200 ml 0.5 mol/L sodium hydroxide solution;

soaking overnight;

neutralizing the remaining hydrochloric acid in the resin;

repeatedly rinsing the polymer grains with a large quantity of de-ionized water until the water is neutral;

filtering to obtain the hydrolytic product, aluminum trichloride;

restoring the acidity of the resin by using 0.5 mol/L of dilute sulfuric acid. The quantity of dilute sulfuric acid used, 0.5 mol/L, is 1000 times the molar quantity of the sulfonic radical of the polymer;

rinsing until neutral with de-ionized water; and vacuum drying at 110° C. to obtain the polymer in this embodiment.

The EW value of this polymer is 1016. The average molecular weight is 380000. The infrared spectrum of this polymer shows that there are symmetric and asymmetric vibration absorption peaks of (O=S=O) at 1211 cm-1 and 1032 cm-1, and a absorption vibration peak of (S—O) at 710 cm-1.

(1) The fabrication of the proton exchange membrane includes the following steps:

dissolving 5 g of the resin obtained from step (1) in 95 g of N-methyl pyrrolidinone to fabricate a 5 wt % solution;

adding 20 ml of solution into a glass container with an area of 50 cm2; and volatizing the solvent on a flat platform by horizontally heating at 70° C. to obtain the 100 micrometer thick proton exchange membrane of this embodiment.

Embodiment 6

The fabrication of sulfo-alkylated poly(α-methyl-styrene) includes the following steps:

adding 15 g of poly(α-methyl-styrene) (PMS and M-80 that are products of WuXi Jiasheng Hightech Modification Material LTD.) into a nitrogen protected four opening flask;

adding 50 ml of anhydrous nitrobenzene and 12.2 g 1,3-propane sultone;

slowly adding 14.7 g anhydrous aluminum trichloride after the styrene-ethylene copolymer resin is thoroughly dissolved;

maintaining the reaction temperature at 100° C., reacting for 20 hours at the condensation reflux state;

pouring the reaction solution into a 500 ml ice water mixture containing 50 ml concentrated hydrochloric acid to terminate the reaction;

filtering the grain shaped polymers;

adding the polymer into a 200 ml 0.5 mol/L sodium hydroxide solution;

soaking overnight;

neutralizing the remaining hydrochloric acid in the resin;

repeatedly rinsing the polymer grains with a large quantity of de-ionized water until the water is neutral;

filtering to obtain the hydrolytic product, aluminum trichloride;

restoring the acidity of the resin by using 0.5 mol/L of dilute sulfuric acid. The quantity of dilute sulfuric acid used, 0.5 mol/L, is 800 times the molar quantity of the sulfonic radical of the polymer);

rinsing until neutral with de-ionized water; and vacuum drying at 110° C. to obtain the polymer in this embodiment.

The EW value of this polymer is 1003. The average molecular weight is 290000. The infrared spectrum of this polymer shows that there are symmetric and asymmetric absorption vibration peaks of (O=S=O) at 1211 cm-1 and 1032 cm-1, and an absorption vibration peak of (S—O) at 710 cm-1.

(2) Fabrication of the proton exchange membrane include the following steps:

dissolving 5 g of the resin obtained from step (1) in 95-g of nitrobenzene/dimethyl sulfoxide solvent mixture to fabricate a 5 wt % solution;

adding 20 ml of solution into a glass container with an area of 50 cm2; and volatizing the solvent on a flat platform by horizontally heating at 120° C. to obtain the 100 micrometer thick proton exchange membrane in this embodiment.

Embodiment 7

(1) The fabrication of sulfo-alkylated poly-trifluoro-styrene includes the following steps:

adding 12.5 g of poly-trifluoro-styrene (TFS, a sample from Shanghai Organic Institute) into a nitrogen protected four opening flask;

adding 50 ml of anhydrous nitrobenzene and 12.2 g 1,3-propane sultone;

slowly adding 14.7 g anhydrous aluminum trichloride after the poly-trifluoro-styrene resin is thoroughly dissolved;

maintaining the reaction temperature at 120° C., reacting for 10 hours at the condensation reflux state;

pouring the reaction solution into a 500 ml ice water mixture containing 50 ml concentrated hydrochloric acid to terminate the reaction;

filtering the grain shaped polymers;

adding the polymer into a 200 ml 0.5 mol/L sodium hydroxide solution;

soaking overnight;

neutralizing the remaining hydrochloric acid in the resin;

repeatedly rinsing the polymer grains with a large quantity of de-ionized water until the water is neutral;

filtering to obtain the hydrolytic product, aluminum trichloride;

restoring the acidity of the resin by using 0.5 mol/L of dilute sulfuric acid. The quantity of dilute sulfuric acid used, 0.5 mol/L, is 500 times the molar quantity of the sulfonic radical of the polymer);

rinsing until neutral with de-ionized water; and vacuum drying at 110° C. to obtain the polymer in this embodiment.

The EW value of this polymer is 1027. The average molecular weight is 300000. The infrared spectrum of this polymer show that there are symmetric and asymmetric vibration absorption peaks of (O=S=O) at 1211 cm-1 and 1032 cm-1, and a vibration absorption peak of (S—O) at 710 cm-1.

(2) The fabrication of the proton exchange membrane include the following steps:

dissolving 5 g of the resin in this embodiment obtained from step (1) in 95 g of N, N-dimethylformamide to fabricate a 5 wt % solution;

adding 20 ml of solution into a glass container with an area of 50 cm2;

volatizing the solvent on a flat platform by horizontally heating at 50° C. to obtain the 100 micrometer thick proton exchange membrane of this embodiment.

Embodiment 8

This embodiment is added to further examine the membrane thickness specified in embodiments of this invention.

(1) The fabrication of sulfo-alkylated polystyrene is the same as that in Embodiment 1.

(2) The fabrication of the proton exchange membrane includes the following steps:

dissolving 10 g of the resin obtained from step (1) in 90 g of N, N-dimethylformamide to fabricate a 10 wt % solution;

adding 5 ml of solution into a glass container with an area of 50 cm2; and volatizing the solvent on a flat platform, by horizontally heating at 50° C. to obtain the 50 micrometer thick proton exchange membrane in this embodiment.

Comparison Example 1

This comparison example describes the fabrication of the sulfonated polyether-ether-ketone and the proton exchange membrane using the sulfonated polyether-ether-ketone.

(1) The fabrication of sulfonated polyether-ether-ketone include the following steps:

adding 5 g of polyether-ether-ketone (PEEK that is a product of Jilin University High-New Material LTD.) into a nitrogen protected three opening flask with stirring machinery;

adding 50 ml of condensed sulfuric acid under argon protection;

maintaining the reaction temperature at 30° C.;

reacting for 10 hours;

pouring the reaction solution into an ice water mixture to terminate the reaction;

stirring and filtering the resin;

rinsing until neutral with de-ionized water to obtain the sulfonated polyether-ether-ketone.

The EW of the sulfonated polyether-ether-ketone is 1030 and it average molecular weight is 300000.

(2) The fabrication of the proton exchange membrane include the following steps:

dissolving 5 g of sulfonated polyether-ether-ketone obtained (1) in 95 g of acetone/water solvent mixture where the weight ratio of acetone and water is 1:1 to fabricate a 5 wt % solution;

adding 20 ml of solution into a glass container with an area of 50 cm2; and volatizing the solvent on a flat platform by horizontally heating at 50° C. to obtain the 100 micrometer thick proton exchange membrane.

Comparison Example 2

This comparison example describes the fabrication of a sulfo-alkylated polyether-sulfone and the proton exchange membrane using sulfo-alkylated polyether-sulfone.

(1) The fabrication of sulfo-alkylated polyether-sulfone includes the following steps:

adding 21.6 g of polyether-sulfone (PES is a products of Jilin University Hi-New Material LTD.) into a nitrogen protected four opening flask;

adding 50 ml of anhydrous nitrobenzene and 12.2 g 1,3-propane sultone;

slowly adding 14.7 g anhydrous aluminum trichloride after the polyether-sulfone resin is thoroughly dissolved;

maintaining the reaction temperature at 150° C., reacting for 8 hours at the condensation reflux state;

pouring the reaction solution into a 500 ml ice water mixture containing 50 ml concentrated hydrochloric acid to terminate the reaction;

filtering the grain shaped polymers;

adding the polymer into a 200 ml 0.5 mol/L sodium hydroxide solution;

soaking overnight;

neutralizing the remaining hydrochloric acid in the resin;

repeatedly rinsing the polymer grains with a large quantity of de-ionized water until the water is neutral;

filtering to obtain the hydrolytic product, aluminum trichloride;

restoring the acidity of the resin by using 0.5 mol/L of dilute sulfuric acid. The quantity of dilute sulfuric acid used, 0.5 mol/L, is 500 times the molar quantity of the sulfonic radical of the polymer;

rinsing until neutral with de-ionized water; and vacuum drying at 110° C. to obtain the polymer in this comparison example.

The EW value of this polymer is 1027. The average molecular weight is 30000.

(2) The fabrication of the proton exchange membrane includes the following steps:

dissolving 5 g of sulfo-alkylated polyether-sulfone resin in 95 g of N, N-dimethylformamide to fabricate a 5 wt % solution;

adding 20 ml of solution into glass container with area of 50 cm2; and volatizing the solvent on a flat platform by horizontally heating at 90° C. to obtain the 100 micrometer thick proton exchange membrane in this comparison example.

Testing of Hydrolytic Stability of Proton Exchange Membranes in Embodiments 1 Through 7 and Comparison Examples 1 and 2

The hydrolytic stability of the proton exchange membrane of the proton membranes obtained in Embodiments 1 through 7 and Comparison Examples 1 and 2 are examined. These proton exchange membranes are soaked in distilled water at 90° C. and sealed using liquid paraffin. The EW of the proton exchange membranes before and after soaking are shown in Table 1.

TABLE 1

| Proton Exchange Membrane | Polymer | EW Value Before Soaking | EW Value After Soaking |
|---|---|---|---|
| Embodiment 1 | sulfo-alkylated polystyrene | 986 | 995 |
| Embodiment 2 | sulfo-alkylated SEBS | 1027 | 1030 |
| Embodiment 3 | sulfo-alkylated SE | 1011 | 1020 |
| Embodiment 4 | sulfo-alkylated styrene-ethylene copolymer | 995 | 1003 |
| Embodiment 5 | sulfo-alkylated polystyrene-butylene random copolymer | 1016 | 1022 |
| Embodiment 6 | sulfo-alkylated poly($\alpha$-methyl-styrene) | 1003 | 1012 |
| Embodiment 7 | sulfo-alkylated poly-trifluoro-styrene | 1027 | 1031 |
| Comparison Example 1 | sulfonated polyether-ether-ketone | 1030 | 3260 |
| Comparison Example 2 | sulfo-alkylated polyether-sulfone | 980 | 995 |

Table 1 shows that the EW values of the proton exchange membranes in Embodiments 1 through 7 after soaking are less than 1% higher than the EW values before soaking. However, the EW value of proton exchange membrane with sulfonated polyether-ether-ketone in Comparison Example 1 is increased by 217% and the EW value of sulfo-alkylated polyether-sulfone in Comparison Example 2 is increased by 1.5%. These tests show that the hydrolytic stability of the proton exchange membranes that are embodiments of this invention is significantly improved. They are substantially better than membranes with sulfonate polyether-ether-ketone where the solfonic radical is connected directly to the benzene ring.

Testing of the Pliancy of Proton Exchange Membranes in Embodiments 1 Through 7 and Comparison Examples 1 and 2

The pliancy of the proton exchange membranes fabricated in Embodiments 1 through 7 and Comparison Examples 1 and 2 are examined. The proton exchange membranes from said embodiments and comparison examples are cut into rectangles that are 5 cm long and 1 cm wide. These rectangles are then place in a blast drying case and dried at 110° C. for 24 hours. Two cm. of the length of each dried membrane is placed between two 1 cm thick stainless steel plates and pressed between the plates. The remaining unpressed length of each membrane is then folded manually back and forth at 90 degrees. The number of folds needed for a split to appear in a membrane is recorded and the results are shown in Table 2.

TABLE 2

| Proton Exchange Membrane | Polymer | Number of folds (times) |
|---|---|---|
| Embodiment 1 | sulfo-alkylated polystyrene | 50 |
| Embodiment 2 | sulfo-alkylated SEBS | >1000 |
| Embodiment 3 | sulfo-alkylated SE | >1000 |
| Embodiment 4 | sulfo-alkylated styrene-ethylene copolymer | >500 |
| Embodiment 5 | sulfo-alkylated polystyrene-butylene random copolymer | >500 |
| Embodiment 6 | sulfo-alkylated poly($\alpha$-methyl-styrene) | 60 |
| Embodiment 7 | sulfo-alkylated poly-trifluoro-styrene | 50 |

TABLE 2-continued

| Proton Exchange Membrane | Polymer | Number of folds (times) |
|---|---|---|
| Comparison Example 1 | sulfonated polyether-ether-ketone | 20 |
| Comparison Example 2 | sulfo-alkylated polyether-sulfone | 20 |

Table 2 shows that the proton exchange membranes that are embodiments of this invention are more pliant when dry.

Testing of the Dimensional Stability of Proton Exchange Membranes in Embodiments 1 Through 7 and Comparison Examples 1 and 2

The expansion characteristics of the proton exchange membranes fabricated in Embodiments 1 through 7 and Comparison Examples 1 and 2 are examined. The proton exchange membrane in said embodiments and comparison examples are placed in a blast drying case and dried at 110□ for 24 hours to obtain the dried membranes. Each membrane from these embodiments is then cut into rectangles. Using vernier calipers, a length of L1 and width W1 of the dry membrane is measured and marked off. The proton exchange membrane is then placed in 80□ hot water until the weight of the membrane stops increasing. Again using vernier calipers, the new length L2 and width W2 corresponding to the length of the expanded length "L1" and the expanded width of "W1" of the wet membrane is measured. The surface expansion ratio (SS) of the membrane: SS=(L2×W2)÷(L1×W1)×100% can then be calculated. For better comparison, all membranes can be cut into squares of 5 cm×5 cm using a scalpel. The results are shown in Table 3.

TABLE 3

| Proton Exchange Membrane | Polymer | SS |
|---|---|---|
| Embodiment 1 | sulfo-alkylated polystyrene (EW = 986) | 127% |
| Embodiment 2 | sulfo-alkylated SEBS (EW = 1027) | 120% |
| Embodiment 3 | sulfo-alkylated SE (EW = 1011) | 119% |
| Embodiment 4 | sulfo-alkylated styrene-ethylene copolymer (EW = 995) | 114% |
| Embodiment 5 | sulfo-alkylated polystyrene-butylene random copolymer (EW = 1016) | 115% |
| Embodiment 6 | sulfo-alkylated poly(α-methyl-styrene) (EW = 1003) | 131% |
| Embodiment 7 | sulfo-alkylated poly-trifluoro-styrene (EW = 1027) | 137% |
| Comparison Example 1 | sulfonated polyether-ether-ketone (EW = 1030) | 300% |
| Comparison Example 2 | sulfo-alkylated polyether-sulfone (EW = 980) | 225% |

Table 3 shows that the expansion properties of the proton exchange membranes with comparable EW values (around 1000) and comparable thickness (100 micrometers) and that are embodiments of this invention are significantly better that existing proton exchange membranes. Therefore, proton exchange membranes that are embodiments of this invention have excellent dimensional stability.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but all those other and further alterations and modifications as would be apparent to those of ordinary skilled in the art.

We claim:

1. A proton exchange membrane having a proton exchange membrane polymer consisting of:
   a main chain, and
   one or more branch chains directly connected to said main chain wherein the chemical formula for at least one of said branch chains is

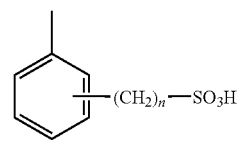

where n is an integer;
   said main chain is a first polymer selected from the group consisting of: aliphatic polymers, aliphatic block polymers, and aliphatic random copolymers;
   said main chain is connected at one of the chemical bonds of the benzene ring of said branch chains; and
   the $-(CH_2)_n-SO_3H$ radical in said at least one of the branch chains is connected to the benzene ring in said at least one of the branch chains at one of the following positions, including a para-position, a meta-position, and an ortho-position, of the chemical bond of the benzene ring in said at least one of the branch chains that connects to said main chain.

2. The proton exchange membrane having a proton exchange membrane polymer of claim 1 wherein n is from 3 to 6.

3. The proton exchange membrane having a proton exchange membrane polymer of claim 1 wherein the average molecular weight of said polymer is from 100000 to 600000.

4. The proton exchange membrane having a proton exchange membrane polymer of claim 1 wherein the equivalent weight (EW) of said proton exchange membrane polymer is from 400 to 3000.

5. The proton exchange membrane having a proton exchange membrane polymer of claim 1 wherein said proton exchange membrane polymer is a sulfo-alkylated polystyrene having the chemical formula

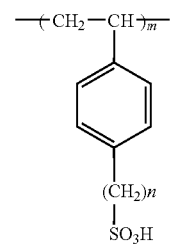

and wherein m is an integer from 1000 to 6000.

6. The proton exchange membrane having a proton exchange membrane polymer of claim 1 wherein said proton exchange membrane polymer having the chemical formula:

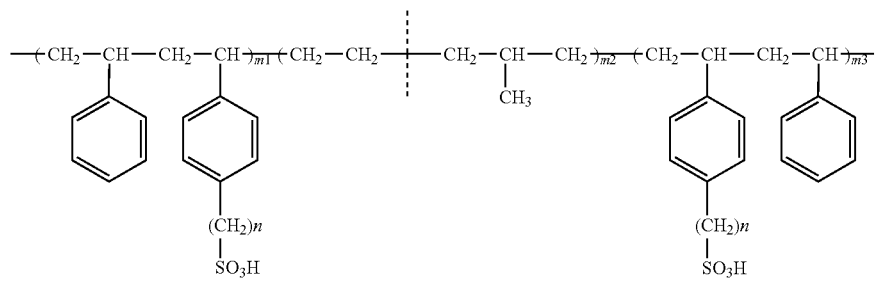

and wherein $m_1$ and $m_3$ are integers from 0 to 3000; $m_1+m_3>0$; and, $m_2$ is an integer from 0 to 5000.

7. The proton exchange membrane having a proton exchange membrane polymer of claim 1 wherein said proton exchange membrane polymer having the chemical molecular formula

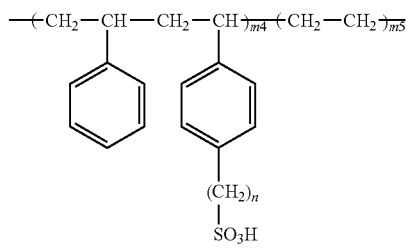

and wherein $m_4$ is an integer from 300 to 3000 and $m_5$ is an integer from 1000 to 10000.

8. The proton exchange membrane having a proton exchange membrane polymer of claim 1 wherein said proton exchange membrane polymer is a sulfo-alkylated polystyrene-ethylene copolymer having the chemical formula:

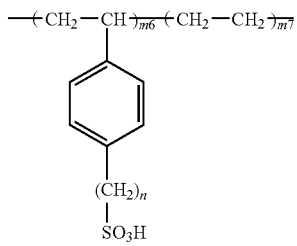

and wherein $m_6$ is an integer from 300 to 3000 and $m_7$ is an integer from 1000 to 10000.

9. The proton exchange membrane having a proton exchange membrane polymer of claim 1 wherein said proton exchange membrane polymer is a sulfo-alkylated polystyrene-butylene copolymer having the chemical formula:

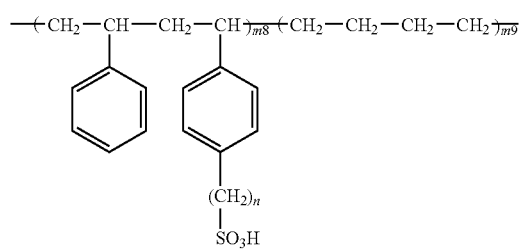

and wherein $m_8$ is an integer from 300 to 3000 and $m_9$ is an integer from 1000 to 6000.

10. The proton exchange membrane having a proton exchange membrane polymer of claim 1 wherein said proton exchange membrane polymer is a sulfo-alkylated poly($\alpha$-methyl-styrene) having the chemical formula

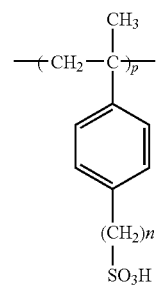

and wherein p is an integer from 1000 to 5000.

11. The proton exchange membrane having a proton exchange membrane polymer of claim 1 wherein the thickness of said proton exchange membrane is from 10 micrometers to 500 micrometers.

* * * * *